(12) United States Patent
Minocha et al.

(10) Patent No.: US 8,918,357 B2
(45) Date of Patent: Dec. 23, 2014

(54) SYSTEM AND METHOD FOR WEB KNOWLEDGE EXTRACTION

(75) Inventors: Hemant Minocha, Karnataka (IN); Fakrudeen Ali Ahmed, Karnataka (IN); Venkatavaradan Ragunathan, Karnataka (IN); Vikram Verma, Karnataka (IN); Gopal Mishrimalji Rajpurohit, Gujarat (IN); Syama Prasad Suprasadachandranpillai, Kerala (IN); Tom Praison Rajadurai A, Karnataka (IN); Muralidhar Hanumantachar Sortur, Karnataka (IN); Sachidanand Alle, Karnataka (IN); Ramashish Baranwal, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 578 days.

(21) Appl. No.: 13/191,231

(22) Filed: Jul. 26, 2011

(65) Prior Publication Data

US 2013/0031131 A1    Jan. 31, 2013

(51) Int. Cl.
*G06F 7/00* (2006.01)
*G06F 17/00* (2006.01)
*G06F 17/30* (2006.01)
*G06Q 10/06* (2012.01)
*G06Q 30/02* (2012.01)

(52) U.S. Cl.
CPC .......... *G06F 17/30* (2013.01); *G06F 17/30861* (2013.01); *G06Q 10/06* (2013.01); *G06Q 30/02* (2013.01)
USPC ....................................................... 707/602

(58) Field of Classification Search
CPC .................... G06F 17/30445; G06F 17/30566
USPC ......................................................... 707/602
See application file for complete search history.

(56) References Cited

U.S. PATENT DOCUMENTS

| | | | | |
|---|---|---|---|---|
| 6,976,210 | B1 * | 12/2005 | Silva et al. ..................... | 715/205 |
| 2005/0086588 | A1 * | 4/2005 | McGregor et al. ............ | 715/505 |
| 2005/0234964 | A1 * | 10/2005 | Batra et al. .................... | 707/102 |
| 2006/0015873 | A1 * | 1/2006 | Dettinger et al. ............. | 718/102 |
| 2006/0253423 | A1 * | 11/2006 | McLane et al. .................. | 707/2 |
| 2010/0037127 | A1 * | 2/2010 | Tomasic et al. ............... | 715/224 |
| 2010/0318393 | A1 * | 12/2010 | Acker et al. ...................... | 705/8 |
| 2011/0161375 | A1 * | 6/2011 | Tedder et al. ................. | 707/803 |
| 2011/0289515 | A1 * | 11/2011 | Hung et al. ................... | 719/318 |
| 2012/0221623 | A1 * | 8/2012 | Ebrahimi et al. ............. | 709/202 |

* cited by examiner

*Primary Examiner* — Mahesh Dwivedi
*Assistant Examiner* — Kris Mackes
(74) *Attorney, Agent, or Firm* — Pillsbury Winthrop Shaw Pittman LLP

(57) ABSTRACT

Embodiments of the disclosed invention include an apparatus, method, and computer program product for creating and executing a client workflow for web data extraction. For example, the disclosed embodiments provide a system for web data extraction. The system includes a data storage component configured for storing a plurality of preconfigured reusable software components that provide services for creating a client workflow for web data extraction. The system also includes a communication interface operable to receive workflow definitions from a client for creating the client workflow for web data extraction utilizing at least one of the plurality of preconfigured reusable software components. The system has a processor for executing instructions to run the client workflow for web data extraction.

17 Claims, 6 Drawing Sheets

SYSTEM AND METHOD FOR WEB KNOWLEDGE EXTRACTION

FIELD OF THE INVENTION

Embodiments of the present invention generally relate to a system and method for extracting web data. More specifically, embodiments of the invention aim to simplify, speed deployment, and standardize creation and execution of workflows for web knowledge extraction.

BACKGROUND

Data extraction is the act or process of retrieving structured or unstructured data out of data sources for further data processing or data storage. Typical unstructured data sources include web pages, emails, documents, PDFs, scanned text, mainframe reports, spool files etc. Though the Web is best known as a vast repository of shared documents, it also contains a significant amount of structured data covering a complete range of topics, from product to financial, public-record, scientific, hobby-related, and government. Structured data on the Web shares many similarities with the kind of data traditionally managed by commercial database systems but also reflects some unusual characteristics of its own; for example, it is embedded in textual Web pages and must be extracted prior to use; there is no centralized data design as there is in a traditional database; and, unlike traditional databases that focus on a single domain, it covers everything.

The business need for structured and unstructured extractions is well known. The domains range from augmenting search results, providing rich results to properties and targeted advertising where extracted information can be used to improve user experience as well as targeted advertisements.

However, currently, every design or development team that requires extraction of structured data [e.g. review ratings, store hours of operation, store phone number, hotel photos, etc.] from the web has to develop their own workflow execution mechanisms from scratch for retrieving and processing the structured data. So instead of concentrating on the business problem at hand, they have to worry about peripheral problems like how to orchestrate the whole workflow including, but not limited to, designing their own workflow model, developing custom ways of stringing together components using scripts, how to get access to web data, how to validate workflow output on a continuous basis, and how to transfer data between distributed and stand-alone systems.

SUMMARY

The disclosed embodiments recognize the disadvantages of the current methods for web knowledge extraction and aim to provide a standard workflow application model for developing applications requiring extraction of structured web data for ease of development of these applications.

The disclosed embodiments include a method, apparatus, and computer program product for executing a client workflow for web data extraction. For instance, in one embodiment, a system for generating and executing a client workflow for web data extraction is disclosed. The system includes a data storage component configured for storing a plurality of preconfigured reusable software components that provide services for creating a client workflow for web data extraction. The system also includes a communication interface operable to receive workflow definitions from a client for creating the client workflow for web data extraction utilizing at least one of the plurality of preconfigured reusable software components. The system has a processor for executing instructions to run the client workflow for web data extraction.

In another embodiment, a method, implemented on a machine having at least one processor, storage, and a communication platform connected to a network for web data extraction is disclosed. The method receives workflow definitions from a client device for at least one of a plurality of preconfigured reusable software components that provide services for creating a client workflow for web data extraction. The method generates the client workflow using the workflow definitions and executes the client workflow for web data extraction.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The accompanying drawings constitute a part of this specification and illustrate one or more embodiments of the disclosed system and methods, and further enhance the description thereof provided in this specification.

DETAILED DESCRIPTION

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
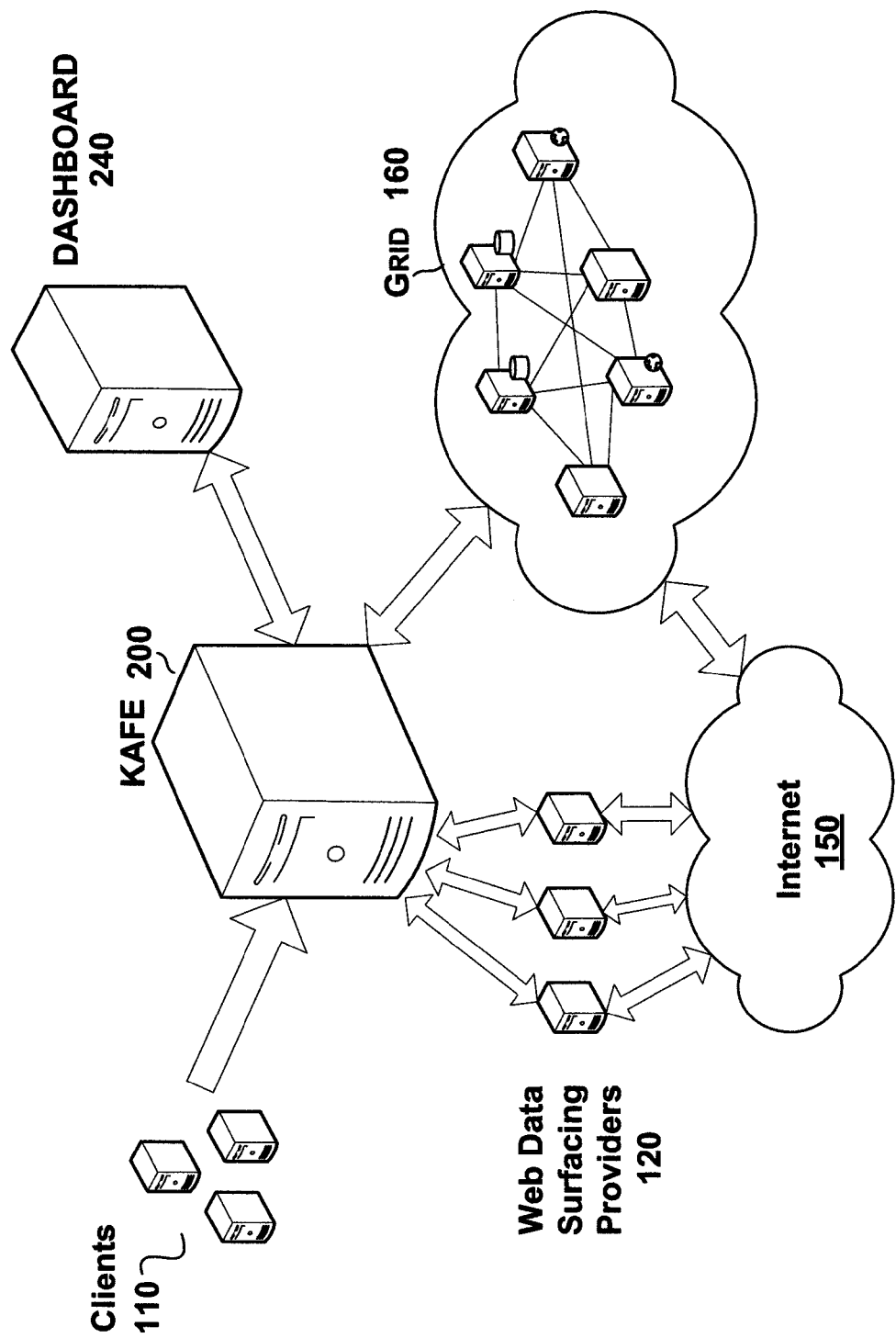
FIG. 1 illustrates a network environment in which certain illustrative embodiments may be implemented.

Beginning with FIG. 1, a network environment 100 in which certain illustrative embodiments may be implemented is depicted. In the depicted embodiment, the network environment 100 includes a Knowledge Acquisition Framework for Extractions (KAFE) application server 200 for executing/running a client workflow for web data extraction such as workflows defined by client systems 110. The KAFE application server 200 provides a standardized workflow definition "language", which the KAFE application server 200 interprets for executing a workflow. The KAFE application server 200 includes a plurality of preconfigured reusable software components that provide services for creating and executing the client workflows for web data extraction thus reducing the overall development time for such solutions. As will be further described, the KAFE application server 200 also includes a plurality of task interfaces operable to provide functionalities for performing a plurality of web data extraction related tasks. For example, the KAFE application server 200 includes a designer interface in communication with a designer component executed on one of the client systems 110 for enabling a workflow designer/client to select from the plurality of preconfigured reusable software components, provide additional custom components, and provide the workflow definitions for configuring the client workflow for web data extraction. In addition, as will be further described in more detail, the KAFE application server 200 includes a Web surfacing component for communicating and extracting web data from the Internet 150 using at least one of a plurality of web data surfacing providers 120.

In some embodiments, the KAFE application server 200 may also include a grid processing component for distributing workload processing to a grid 160. The grid 160 provides a plurality of computer resources for distributed processing. The plurality of computer resources may be loosely coupled, heterogeneous, and geographically dispersed. The grid 160 may be constructed with the aid of general-purpose grid software libraries. For example, in one embodiment, the grid 160 is implemented as an Apache™ Hadoop™ grid. Apache Hadoop's open-source software library is a framework that allows for the distributed processing of large data sets across clusters of computers using a simple programming model. It is designed to scale up from single servers to thousands of machines, each offering local computation and storage.

Figure 2:
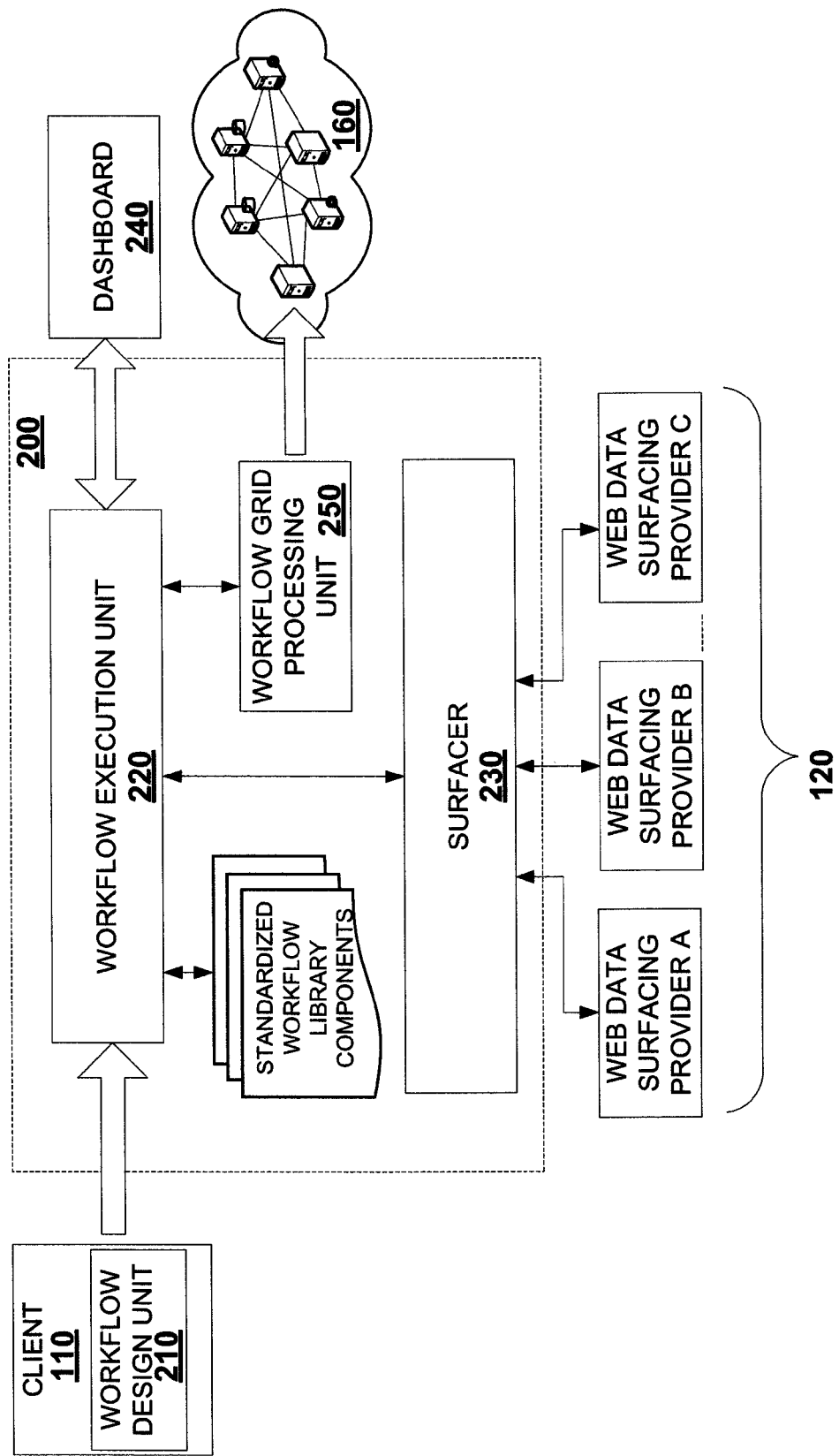
FIG. 2 illustrates exemplary components of a system in which certain illustrative embodiments may be implemented.

Referring now to FIG. 2, exemplary components of the KAFE application server 200 is illustrated. In the depicted embodiment, the KAFE application server 200 includes a workflow execution unit 220 for generating and executing workflows for extracting web data. As part of the disclosed embodiments, the KAFE application server 200 includes a plurality of standardized workflow library components 260 (i.e., preconfigured reusable software components) that may be utilized by the workflow execution 220 in generating and executing a client workflow. Examples of the library components 260 include a datajoin component and a dedup component. These related components operate on the data of each element (identified by an id/key) coming in from multiple forks of the workflow and joins all the information of same element or keeps only one of them, respectively. For example, one fork of the workflow may be getting the address and phone no. of the store (the "element") and another may be getting the operating hours and the datajoin component combines the data for this store together. The dedup component eliminates all but one instance of the same store occurring in the data.

Other examples of the library components 260 include an output validation component that takes in the output and validates it according to a set of automated rules (e.g., the output validation component may ensure that the output conforms to a schema, such as, but not limited to, verifying that every element is not more than specific size and that some specific set of elements (i.e., a 'golden set') is found as part of the output to identify a valid feed; a surfacing component 230 (as illustrated in FIG. 2); a grid transferring component for transferring data in and out of the grid to non-grid machines; a grid processing/workflow scheduling and monitoring component 250 that manages the life cycle of grid sub-workflow of the main KAFE workflow (also illustrated as an example in FIG. 2); a rules based extraction component for applying XSLT based rules or custom technology rules to content from a Web corpus (e.g., a Web corpus can be content from Bing or can be directly crawled by Yahoo's infrastructure); a sampling and QA validation component that provides generic sampling mechanism from output feed (e.g., select 2000 records from 0.1 million records for editorial review) and a QA validation component that takes these sampled records and sends them off to the QA dashboard provided by the KAFE application server 200.

In a preferred embodiment, the plurality of standardized workflow library components 260 is designed to extract structured information from the web. Examples of structured information include gathering information about all the stores selling a particular brand in all zip codes, finding the homepage of all the interesting entities like schools and restaurants, or finding menu items of all restaurants for a particular zip code. The information may be structured according to any of a plurality of structured models. For example, the information may be structured using Extensible Markup Language (XML) and/or JavaScript Object Notation (JSON). XML is a set of rules for encoding documents in machine-readable form. Similarly, JSON is a data-interchange format that encodes data in a collection of name/value pairs. In certain embodiments, the KAFE application server 200 may also be utilized to run unstructured extraction workflows.

A workflow designer utilizing a workflow design component 210 on a client system 110 may select desired components from the plurality of standardized workflow library components 260 for defining a client workflow. In addition, the workflow designer may also provide a plurality of custom components that provide services for custom logic for web data extraction utilizing the workflow design component 210.

One unique feature of the KAFE application server 200 is the web data extraction services performed by the surfacing component 230. As illustrated in FIG. 2, the workflow execution unit 220 may utilize the surfacing component 230 to extract web data using at least one of a plurality of web data surfacing providers 120 (e.g., web data surfacing provider A, web data surfacing provider B, and web data surfacing provider C). Although, only three web data surfacing providers are illustrated, the disclosed embodiments are not limited by the number of web data surfacing providers in which the surfacing component 230 may utilize. Examples of web data surfacing providers include Yahoo!® Search Technology (YST) which crawls the web and extracts web data for Yahoo!® and other search providers. YST is used for extracting web data in bulk by performing multiple hops on a single link [hops being how many levels of a link that is followed]. Other web data surfacing providers include, but are not limited to, Web Crawl Corpus (WCC), which provides crawled data from Microsoft®; Low Level Fetching Service (LLFS), which is used by YST crawlers to actually fetch the data one URL at time, and WGET, a free software application as part of the GNU Project for getting files from HTTP/FTP servers.

Each of the web data surfacing providers 120 are capable of performing certain features for web data extraction, some of which are not shared by other web data surfacing providers. In addition, each of the web data surfacing providers 120 require a certain formatted request (e.g. certain parameters), based upon the implementation of their application programming interface (API). Therefore, currently, a workflow designer requiring a certain feature must know which of the plurality web data surfacing providers 120 provides said feature and must also implement the request in the format corresponding to the determined web data surfacing provider.

However, in accordance with the disclosed embodiments, the surfacing component 230 provides an abstract interface for surfacing all of the web data surfacing providers 120 in a uniform way for executing the client workflows. Because the KAFE application server 200 enables a client to define the workflow utilizing a standardized workflow definition language, the client defined workflow may utilize the extracted web data content from at least one the plurality of web data service providers 120 provided by the surfacing component 230 as input data for performing the client workflow.

Another one of the standardized workflow library components 260 provided by the KAFE application server 200 is the grid processing component 250. The grid processing component 250 includes instructions for distributing the workload processing to the grid 160. For example, in one embodiment, the grid processing component 250 includes instructions for batch processing for huge data sets. For instance, the grid processing component 250 may distribute chunks of data received from the surfacing component 230 for enabling workload processing to occur on received batches of web data while awaiting additional batches of web data from the plurality of data extraction services.

In addition, in some embodiments, the grid processing component 250 may include instructions for processing the information returned from a grid resource. Still, in certain embodiments, a web data service provider 120 may run directly in grid 160 and surfaces data directly onto the grid 160. Of course, in some embodiments, the workload processing may be performed solely on standalone device.

In addition, in certain embodiments, the standardized workflow library components 260 include a dashboard interface for providing workload processing information to a dashboard component 240. The dashboard component 240 organizes and presents information for enabling a user to monitor information regarding the execution of one or more workflows. In some embodiments, the dashboard component 240 may be user customizable and/or may be interactive. For example, in one embodiment, the dashboard component 240 enables a user to deploy and start his/her workflow. The dashboard component 240 may also be configured to enable a user to monitor the progress of the workflow. For example, the dashboard component 240 may enable a user to identify which component in the workflow pipeline is currently executing, how long each component took, individual statistics outputted by the components (e.g. number of URLs crawled, number entities joined, amount of data transferred to grid etc.). In certain embodiments, if there is a failure, the dashboard component 240 enables a user to drill down to the exact failure. In some embodiments, the dashboard component 240 may also enable quality assurance services by providing a generic editorial overview interface for the workflow output (e.g., the output is expected to follow a particular format such as, but not limited to, an enhanced JSON format, but the schema itself may be configurable).

Figure 3:
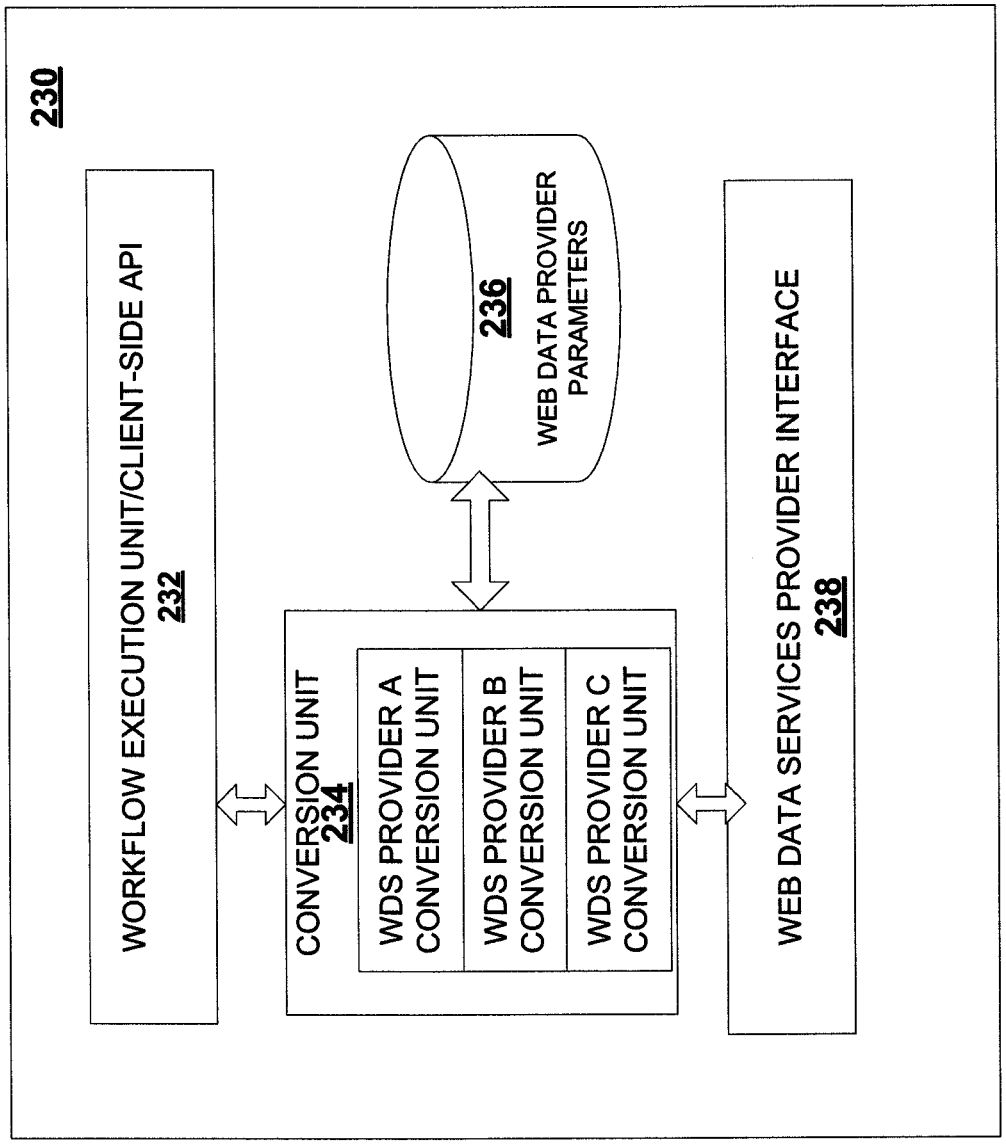
FIG. 3 illustrates components of a surfacing component in accordance with an exemplary embodiment.

Referring now to FIG. 3, an embodiment of the surfacing component 230 is illustrated. In the depicted embodiment, the surfacing component 230 includes a workflow execution unit client-side interface 232, a conversion unit 234, and a web data service providers interface 238. The workflow execution unit client-side interface 232 provides services to the workflow execution unit 220. For example, in one embodiment, the workflow execution unit client-side interface 232 includes, but is not limited to, the following functions: getContents (urlpattern, urls[ ], timeConstraint), getJobStatus(jobId), Other Job Management APIs (jobId), registerNotification-Handler(batchready handler, job completion handler).

As stated above, each of the plurality of web data surfacing providers 120 may perform certain features for web data extraction, which are not shared by other web data surfacing providers. In addition, each of the web data surfacing providers 120 requires a certain formatted request. The conversion unit 234 includes instructions for determining which of the web data surfacing providers 120 is capable of satisfying a request received from the workflow execution unit client-side interface 232 and translating the request to the determined service provider API format based on a set of web data service provider parameters 236.

In one embodiment, examples of functions provided by the Web Data Services Provider Interface 238 include, but not limited to, getCapabilities( ), batchreadyhandler(signal-BatchReady) submitFetchJob(FetchDetails), getContent (JobDetails), JobManagementAPIs(jobId), and registerNotificationHandler(batchready handler, job completion handler). The names of each of the functions are descriptive as to their functions. For instance, batchreadyhandler (signal-BatchReady) enables huge amount of data to be processed without having to wait for the full latency of all the data. This feature removes the storage requirement of having to store all the data for processing since every processed batch can be cleaned up. Also this asynchronous notification mechanism allows the sub-workflows (with data from one batch) to be started automatically as soon as the data is available.

Figure 4:
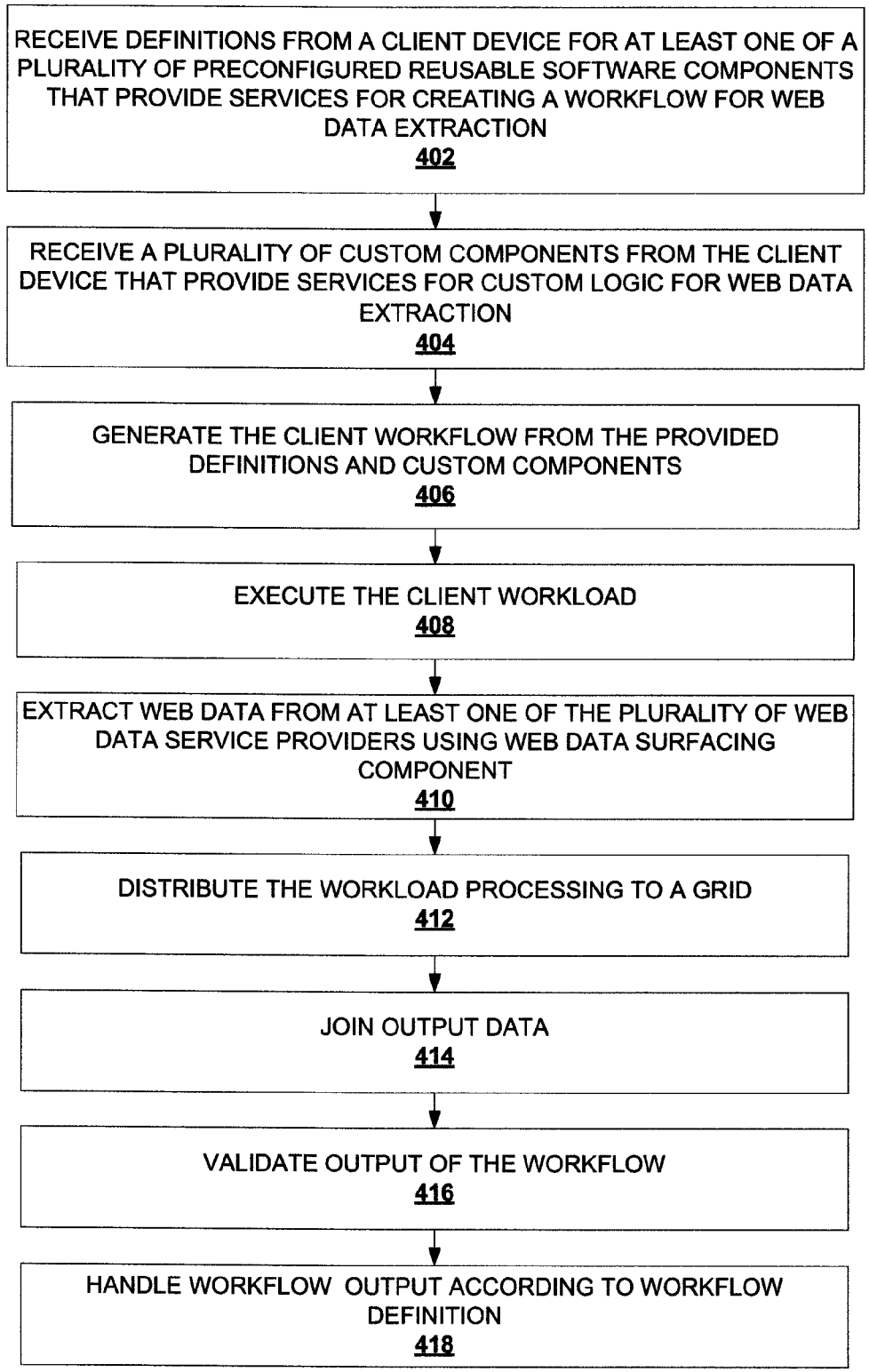
FIG. 4 illustrates a method for executing a workflow for web data extraction in accordance with an exemplary embodiment.

With reference now to FIG. 4, a method 400 performed by the KAFE application server 200 for generating and executing a workflow for web data extraction is illustrated in accordance with an exemplary embodiment. Beginning at step 402, the method receives definitions from a client device for at least one of a plurality of preconfigured reusable software components that provide services for creating a workflow for web data extraction. As referenced herein, a client device may be any type of computing device including, but not limited to, a desktop computer, a laptop, a tablet device, a PDA, and/or a smart phone. In addition, in the depicted embodiment, the method receives at step 404, a plurality of custom components from the client device that provide services for custom logic for web data extraction. At step 406, the method generates the client workflow from the provided definitions and custom components provided by the client device. At step 408, the method executes the client workload on the KAFE application server 200. As part of the execution of the client workload, the method at step 410, communicates with a web data surfacing component for extracting web data from at least one of the plurality of web data service providers. In certain embodiments, the method at step 412 distributes the workload processing to a grid and joins the output data from the grid at step 414 for producing an output of the client workflow. In one embodiment, the method at step 416 may validate the output of the entire workflow against one or more rules for verifying the structured information.

Upon successful validation, the method at step 418 transfers the output of the workflow in accordance with the definitions of the client workflow, with method 400 terminating thereafter. For example, the workflow may specify that the output be transferred from the grid 160 to a dropbox location. In some embodiments, the client workflow may specify that the output be maintained in the grid 160 and that other KAFE workflows start with this output as their input.

Figure 5:
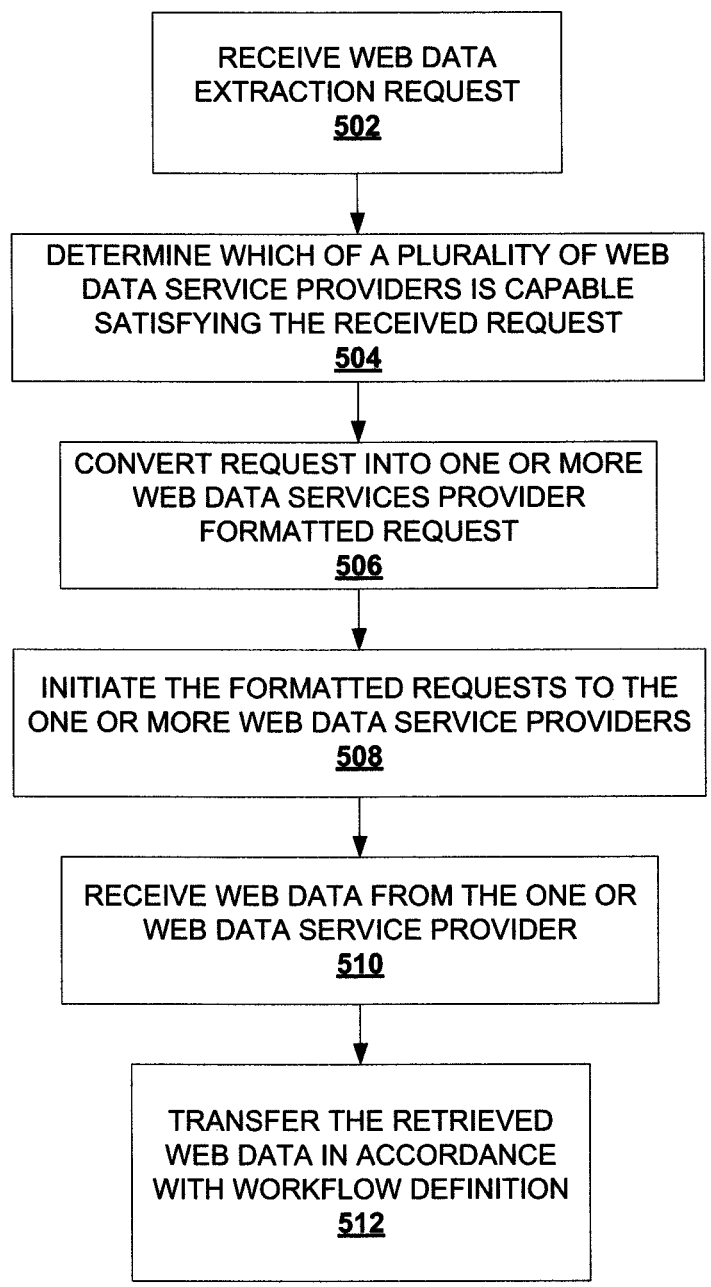
FIG. 5 illustrates a method for retrieving web data from at least one of a plurality of web data extraction services.

Referring to FIG. 5, a method 500 performed by the surfacing component 230 for retrieving web data from at least one of a plurality of web data extraction services is presented. In the depicted embodiment, the method receives a request for web data extraction at step 502. The method at step 504 determines which of a plurality of web data service providers is capable of satisfying the received request. The method at step 506 converts the received request to a request format corresponding to one or more web data service providers determined to be capable of satisfying the received request. The method at step 508 initiates the formatted requests to the one or more web data service providers. In one embodiment, the method at step 510 receives web data from the one or web data service providers in response to the request. The process at step 512 may pass the received web data to the workload execution unit 220 for further processing and handling and/or may pass the received web data to the grid 160 for further processing, with the method 500 terminating thereafter.

Figure 6:
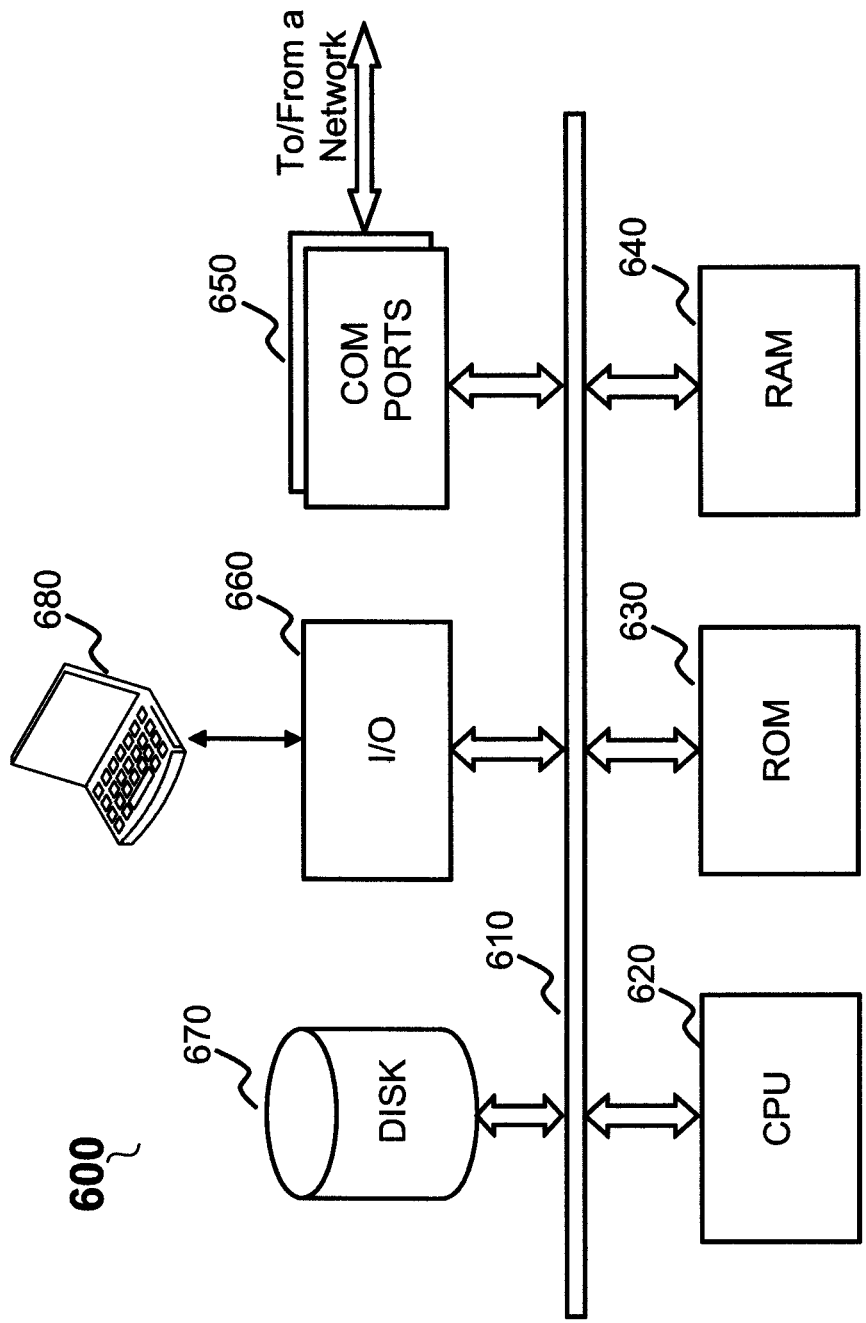
FIG. 6 illustrates a general computer architecture in which certain illustrative embodiments may be implemented.

FIG. 6 depicts a general architecture of a computer 600 in which the disclosed embodiments may be implemented. The computer 600 may be a general purpose computer or a special purpose computer. The computer 600 includes, among other components, COM ports 650 connected to and from a network connected thereto to facilitate data communications. The computer 600 also includes a central processing unit (CPU) 620, in the form of one or more processors, for executing program instructions. The exemplary computer platform includes an internal communication bus 610, program storage and data storage of different forms, e.g., disk 670, read only memory (ROM) 630, or random access memory (RAM) 640, for various data files to be processed and/or communicated by the computer 600, as well as possibly program instructions to be executed by the CPU. The computer 600 also includes an I/O component 660, supporting input/output flows between the computer and other components therein. The computer 600 may also receive programming and data via network communications.

The computer 600 may be used to implement any components for extracting web data as described herein. For example, the computer 600 may be utilized to implement the KAFE application server 200 and/or just a portion of the KAFE application server 200 such as the surfacing component 230. In addition, the computer 600 may be used to implement the workflow design component 210 and the dashboard component 240. The computer 600 may also represent the architecture of one or more of the devices in the grid 160. The architecture of the computer 600 is merely provided as an example and is not intended to limit the disclosed embodiments to any particular configuration.

Accordingly, the disclosed embodiments provide a workflow application server that provides a standardized workflow definition language and for creating a client workflow for web data extraction. In addition, the disclosed embodiments provide a plurality of preconfigured reusable software components that provide services for creating and executing the client workflows for web data extraction.

Advantages of the disclosed embodiments include, but are not limited to, reducing the overall development time and complexity for creating and executing a workflow for web data extraction. For instance, the disclosed embodiments provide a web surfacing component that enables a workflow developer to extract data from a plurality of web data surfacing provider without having to understand the interface/internals of multiple web data surfacing providers. The disclosed embodiments abstracts the workflow from the actual implementation of data surfacing mechanism, thereby enabling its implementation using different mechanisms (e.g., a production one and a development one or even different mechanisms depending on the scale required). This enables agile experimentation and a seamless transition from development to production with respect to web data surfacing. Further, the disclosed embodiments future proof the workflow applications in case a web data surfacing mechanism becomes obsolete. Moreover, the disclosed embodiments enable future caching and reuse at the level agnostic to all implementations when multiple applications use the interface at the same time.

Hence, aspects of the methods of the disclosed embodiments, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A system for web data extraction, comprising:
a non-transitory data storage component configured for storing a plurality of preconfigured reusable software components that provide services for creating a client workflow for web data extraction;
a communication interface operable to receive information related to workflow from a client for creating the client workflow for web data extraction utilizing at least one of the plurality of preconfigured reusable software components; and
a processor for executing instructions to run the client workflow for web data extraction, wherein the plurality of preconfigured reusable software components includes a web data surfacing component configured for extracting web data from a plurality of web data extraction services, the web data surfacing component comprising instructions for formatting the request in at least one format to generate the at least one formatted request, communicating the at least one formatted request to the at least one of the plurality of web data extraction services, and receiving a response from the at least one of the plurality of web data extraction services.

2. The system of claim 1, wherein the client workflow includes at least one custom workflow component provided by the client for providing services for custom logic for web data extraction.

3. The system of claim 1, wherein the plurality of preconfigured reusable software components includes a grid processing component.

4. The system of claim 2, wherein the plurality of preconfigured reusable software components includes a designer interface in communication with a designer component, wherein a client selects the plurality of custom components and provides the information related to workflow using the designer component for configuring the client workflow for web data extraction.

5. The system of claim 1, wherein the plurality of preconfigured reusable software components includes a dashboard interface for providing workflow monitoring services to a dashboard component.

6. The system of claim 1, wherein the web data surfacing component comprises:
instructions for receiving a request to extract web data; and
instructions for combining the response from the at least one of the web data extraction services into a combined formatted response for satisfying the request.

7. The system of claim 6, wherein the instructions for formatting the request in at least one format associated with at least one of the plurality of web data extraction services comprises:
instructions for identifying requirements of the request; and
instructions for identifying the at least one of the plurality of data extraction services capable of satisfying the requirements of the request based on parameters of each of the plurality of data extraction services.

8. The system of claim 6, wherein the processor further executes instructions to transfer the response received from the at least one of the plurality of data extraction services in batches for enabling workload processing to occur on received batches of web data while awaiting additional batches of web data from the at least one of the plurality of data extraction services.

9. The system of claim 6, wherein the processor further executes instructions to transfer the response received from the at least one of the plurality of data extraction services to a distributed grid for workload processing.

10. The system of claim 6, wherein the processor further executes instructions to validate the output of the client workflow for web data extraction, wherein the output is in one of a plurality of structured formats.

11. A method, implemented on a machine having at least one processor, storage, and a communication platform connected to a network for web data extraction, the method comprising:
receiving information related to workflow from a client device for at least one of a plurality of preconfigured reusable software components that provide services for creating a client workflow for web data extraction;
generating the client workflow based on the information related to workflow; and
extracting web data in accordance with the client workflow which comprises:
formatting a web data extraction request in at least one format to generate the at least one formatted request,
communicating the at least one formatted request to the at least one of the plurality of web data extraction services, and
receiving a response from the at least one of the plurality of web data extraction services that received the at least one formatted request.

12. The method of claim 11 further comprising:
receiving at least one custom workflow component from the client device for providing services for custom logic for web data extraction; and
wherein generating the client workflow includes generating the client workflow based on the information related to workflow and the at least one custom workflow component.

13. The method of claim 11 further comprising:
transferring the response received from the at least one of the plurality of data extraction services to a distributed grid for workload processing.

14. The method of claim 11 further comprising:
validating the output of the client workflow against at least one rule for verifying a structure of the output.

15. A machine-readable tangible and non-transitory medium having information for web data extraction, wherein the information, when read by the machine, causes the machine to perform the following:
receive information related to workflow from a client device for at least one of a plurality of preconfigured reusable software components that provide services for creating a client workflow for web data extraction;
generate the client workflow based on the information related to workflow;
extract web data in accordance with the client workflow;

format a web data extraction request in at least one format to generate the at least one formatted request;

communicate the at least one formatted request to the at least one of the plurality of web data extraction services; and receive a response from the at least one of the plurality of web data extraction services that received the at least one formatted request.

16. The medium of claim 15, wherein the information, when read by the machine, further causes the machine to:

receive at least one custom workflow component from the client device for providing services for custom logic for web data extraction; and generate the client workflow based on the information related to workflow and the at least one custom workflow component.

17. The medium of claim 15, wherein the information, when read by the machine, further causes the machine to:

transfer the response received from the at least one of the plurality of data extraction services to a distributed grid for workload processing.

* * * * *